US012689875B2

(12) United States Patent
Flynn

(10) Patent No.: US 12,689,875 B2
(45) **Date of Patent: *Jul. 21, 2026**

(54) SYSTEMS AND METHODS FOR PROVIDING TELECOMMUNICATION SERVICE

(71) Applicant: Boost SubscriberCo L.L.C., Englewood, CO (US)

(72) Inventor: Katherine Flynn, Englewood, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 136 days.

This patent is subject to a terminal disclaimer.

(21) Appl. No.: 18/215,667

(22) Filed: Jun. 28, 2023

(65) Prior Publication Data

US 2023/0336665 A1      Oct. 19, 2023

Related U.S. Application Data

(63) Continuation of application No. 17/324,617, filed on May 19, 2021, now Pat. No. 11,736,624.

(60) Provisional application No. 63/152,230, filed on Feb. 22, 2021.

(51) Int. Cl.
*H04W 4/23* (2018.01)
*H04M 15/00* (2006.01)
*H04M 17/00* (2006.01)

(52) U.S. Cl.
CPC ............. *H04W 4/23* (2018.02); *H04M 15/60* (2013.01); *H04M 15/61* (2013.01); *H04M 15/844* (2013.01); *H04M 15/885* (2013.01); *H04M 17/206* (2013.01)

(58) Field of Classification Search
None
See application file for complete search history.

(56) References Cited

U.S. PATENT DOCUMENTS

| | | | |
|---|---|---|---|
| 6,084,628 A | 7/2000 | Sawyer | |
| 6,947,531 B1 | 9/2005 | Lewis et al. | |
| 8,526,586 B2 | 9/2013 | Macwan et al. | |
| 8,625,758 B2 | 1/2014 | Li et al. | |
| 9,160,866 B1 | 10/2015 | Keiser | |
| 9,516,164 B1 * | 12/2016 | Keiser ................ | H04M 3/4878 |
| 11,736,624 B2 * | 8/2023 | Flynn ..................... | H04W 4/24 |
| | | | 455/407 |
| 2002/0136377 A1 | 9/2002 | Stewart et al. | |
| 2007/0274483 A1 | 11/2007 | Shapiro | |

(Continued)

*Primary Examiner* — Quoc D Tran
(74) *Attorney, Agent, or Firm* — Jeremiah J. Baunach; Frontier IP Law PLLC

(57) ABSTRACT

System and methods are disclosed that improve the speed, efficiency and usefulness of providing telecommunication service by computerized telecommunication service. In some embodiments, systems and methods described herein enable a user to receive the telecommunication service to a mobile device of the user, such as by adding data service, minutes and/or text messages to the prepaid plan, in response to having an advertisement played on or otherwise delivered via the mobile device. An ad may be displayed or otherwise played on the mobile device or inserted into messages sent by the user via the mobile device for the user to receive minutes, data or texts added to their prepaid plan. The service carrier may split compensation received from an advertiser for playing an ad on a customer's device between the service carrier and the customer.

19 Claims, 16 Drawing Sheets

(56)           References Cited

U.S. PATENT DOCUMENTS

| | | | |
|---|---|---|---|
| 2010/0211446 A1 | 8/2010 | Ray | |
| 2011/0235792 A1* | 9/2011 | Foster | H04M 17/20 |
| | | | 379/114.2 |
| 2011/0275346 A1* | 11/2011 | Fraser | H04M 3/4878 |
| | | | 455/408 |
| 2012/0209722 A1* | 8/2012 | Plut | G06Q 30/02 |
| | | | 705/14.66 |
| 2013/0211879 A1* | 8/2013 | Holland | G06Q 30/0241 |
| | | | 705/14.55 |
| 2014/0201002 A1 | 7/2014 | Nicastro | |
| 2022/0272205 A1 | 8/2022 | Flynn | |

* cited by examiner

1306

Provide compensation within the mobile telephone device

1304

Cause advertisement to be delivered via a mobile telephone device

1302

SYSTEMS AND METHODS FOR PROVIDING TELECOMMUNICATION SERVICE

TECHNICAL FIELD

The technical field relates to cellular telecommunications and more particularly, to providing cellular telecommunication service to mobile devices.

BRIEF SUMMARY

Prepaid cellular telephones (prepaid cell phones), also known as pay as you go phones or no-contract phones, are popular due to the combination of freedom and control that they offer. With prepaid cell phones, the user pays for a specific amount of data usage, minutes and or text messages in advance. For example, this payment may be made directly to the telecommunication service carrier that has an account associated with the phone, a Subscriber Identity Module (SIM) card in the phone and in some cases also the user, or by purchase of telecommunication service cards redeemable for service via the telecommunication service carrier.

Traditionally, when the user reaches the service limit for which the user has already paid, the service ends until the user buys more data usage, minutes and/or text messages. The user of a prepaid cell phone is not locked into a multi-year plan with a set number of minutes per month, additional charges if the user exceeds the limit and a costly fees if the user breaks the contract. The user of a prepaid cell phone is free to talk whenever they want and as long as they want, until the user runs out of minutes, and the user also does not have to pay a monthly bill. Buying a prepaid cell phone doesn't require a long-term contract and credit check, so students with part-time jobs or older adults with no use of credit or a less-than-perfect credit record can get a phone easily. Thus, these advantages make a prepaid cell phone work particularly well for: occasional cell phone users, short-term users, trial users, parents of teenagers, young adults and others with no credit history, and low income users or users with unstable income. Prepaid phones are also more common in countries outside the U.S. Because they do not require a contract, prepaid phones are fast and easy to buy. They are also available at many locations, ready to use immediately and even disposable.

However, some users may find it difficult to purchase additional telecommunication service (e.g., internet data service, minutes and/or text messages) when the prepaid phone or account associated therewith runs out or is near running out of such services. For example, the user may have low or unstable income or otherwise be in an environment or location where they are unable to access money for purchasing the additional service. Thus, it is important be able to obtain the additional service by other technical solutions.

To solve the above and other technical problems, in one embodiment, the systems and methods described herein enable a user to receive the telecommunication service to a mobile device of the user, such as by adding data service, minutes and/or text messages to the prepaid plan, in response to having an advertisement (ad) delivered via the mobile device. In particular, an option may be electronically presented to the user to receive telecommunication service to the mobile device of the user in response to having an ad delivered via the mobile device. For example, an ad may be displayed or otherwise played on the mobile device, or inserted into messages sent by the user via the mobile device. The system then electronically receives input indicating a selection of the option. Based on receiving the input, the system causes the mobile device to electronically deliver the ad. The system then enables the telecommunication service to be used by the mobile device in response to the ad being delivered. For example, the telecommunication service carrier may add additional data service, minutes and/or text messages to the prepaid plan associated with the mobile device and/or user in response to receiving an indication that the ad has been played on the mobile device.

In some embodiments, the option may be presented in response to a determined amount of telecommunication service remaining available to the mobile device falling below a threshold amount, such as a remaining amount of available data, minutes or text messages falling below a minimum threshold. In other embodiments, the user may have pre-selected the option to automatically have ads played when the amount of telecommunication service remaining available to the mobile device falls below a threshold amount. This threshold amount may be selected by the user. In some embodiments, the user may select the threshold such that the user never needs to pay money for the service, but instead merely watches ads on their cell phone to earn the cellular service for use by that phone. The user may also transfer such service to other users of the cellular service that user had earned by watching or otherwise having ads delivered. A recipient of ads inserted into messages to the recipient may also or instead have telecommunication service such as data service, minutes and/or text messages added to the recipient's telecommunication service account in response to receiving and/or playing the inserted ads.

In some embodiments, the telecommunication service carrier system may split compensation received from a system of an advertiser for playing an ad on a customer's device between the telecommunication service carrier and the customer. The customer portion of the split includes a specified amount of cellular telecommunication service provided by the telecommunication service carrier as the compensation to the customer. In such embodiments, the telecommunication service carrier system may electronically communicate a statement to the customer which indicates, for each of the advertisements delivered, the customer portion of the split that includes the specified amount of cellular telecommunication service added by the telecommunication service carrier. The telecommunication service carrier system may also provide compensation to a customer in the form of adding data service, minutes and/or text messages to the customer's plan for delivery of customized advertisements based on product and service preferences of the customer learned by the telecommunication service carrier system, such as when the telecommunication service carrier system receives consent to monitor online activity of the user via use of the telecommunication service.

Therefore, the speed, efficiency and usefulness of providing telecommunication service by computerized telecommunication service systems are improved by the systems and methods disclosed herein.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
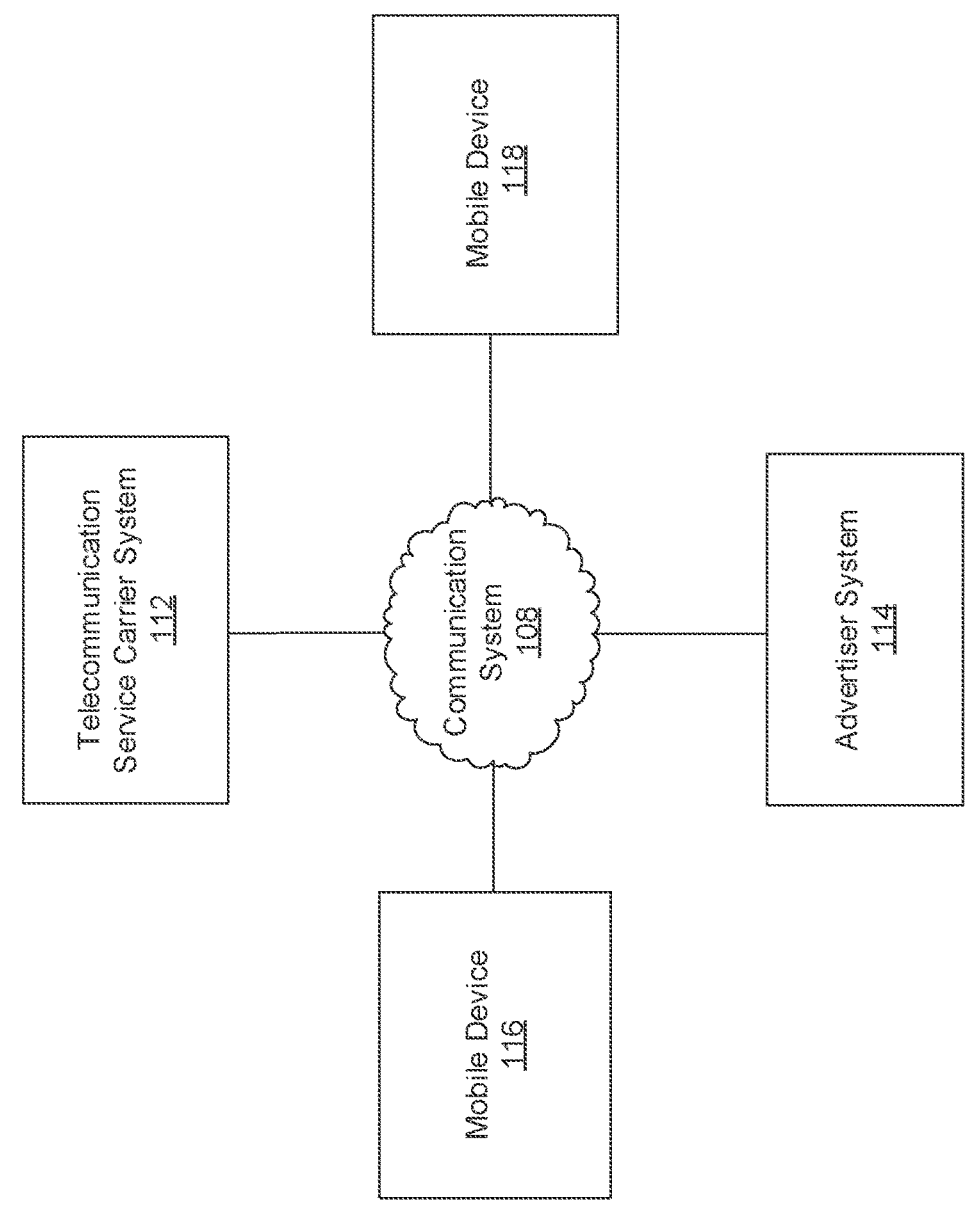
FIG. 1 is a block diagram illustrating an example networked environment in which embodiments of systems and methods for providing telecommunication service may be implemented, according to various example embodiments.
Figure 1:

FIG. 1 is a block diagram illustrating an example networked environment 102 in which embodiments of systems and methods for providing telecommunication service may be implemented, according to various example embodiments.

Shown in FIG. 1 is a mobile device 116, a telecommunication service carrier system 112, another mobile device 118, and an advertiser system 114, each operably connected to each other via communication system 108. Additional or different servers, systems, mobile devices and other devices may also be connected to and communicate with each other and one or more of the systems of FIG. 1 over communication system 108 in various embodiments. For example, mobile device 116, mobile device 118 may be cellular telephones and the telecommunication service carrier system 112 may provide cellular telecommunication service, such as, for example, on a pre-paid basis to mobile device 116, mobile device 118 and other mobile devices (not shown) via communication system 108. In a cellular telecommunication system, as the distributed mobile transceivers of mobile device 116, mobile device 118 and other mobile devices move from cell to cell within communication system 108 during an ongoing continuous communication, switching from one cell frequency to a different cell frequency is done electronically without interruption and without a base station operator or manual switching. The applicable cellular communication towers, antennas, base stations and other related telecommunication equipment may comprise and/or be part of communication system 108.

The mobile device 116 and mobile device 118 may be digital mobile devices or other types of mobile devices in various embodiments. For example, mobile device 116 may be a digital mobile device that has cellular telephone functionality, internet browsing, messaging and other internet capability, and that stores and plays digital images, audio, digital video and other multimedia advertising. For example, the mobile device 116 may store and play digital video according to one or more various digital video encoding/compression techniques, formats and standards. Example digital video encoding/compression techniques include, but are not limited to, MPEG-2, MPEG-4 or HEVC. For example, MPEG-4 is a standard for a group of audio and video coding formats and related technology agreed upon by the ISO/IEC Moving Picture Experts Group (MPEG) (ISO/IEC JTC1/SC29/WG11) under the formal standard ISO/IEC 14496—Coding of audio-visual objects. One or more other digital video encoding/compression techniques, formats and and/or standards may be used in various embodiments. In various embodiments, the mobile device 116 may be, comprise, be part of, or be integrated with, one or more of: a camera, a video camera, a mobile device, a smartphone, a movie camera, a tablet device, a computer, a laptop computer, a notebook computer, a computing device, an IoT device, an action camera, a waterproof camera, a security camera, a security system, a camcorder, a dash cam, a monitoring device or system, a surveillance device or system, a drone, a digital mobile device, a set-top box (STB), a remote control device, a gaming device, a gaming console, etc.

The systems and methods described herein enable a user to receive telecommunication service to a mobile device of the user, such as mobile device 116. This may be perfumed by the telecommunication service carrier system 112 adding data service, minutes and/or text messages to a prepaid cellular telecommunication service plan associated with the mobile device 116 managed by the telecommunication service carrier system 112. Such service may be added in response to having an ad delivered via the mobile device 116. In particular, an option may be electronically presented on the mobile device 116 to the user to receive telecommunication service to the mobile device 116 in response to having an ad delivered via the mobile device 116. For example, an ad may be delivered by being displayed or otherwise played on the mobile device 116 or inserted into messages (e.g., to mobile device 118) sent by the user via the mobile device 116.

The mobile device 116 then electronically receives input indicating a selection of the option. The mobile device may communicate such input to the telecommunication service carrier system via communication system 108. Based on receiving the input, the telecommunication service carrier system 112 may cause the mobile device 116 to electronically deliver the ad, such as by sending a signal to the mobile device 116 over communication system 108 that causes the mobile device 116 to play the ad on the mobile device 116. In some embodiments, the playing of the ad is initiated by the mobile device 116 in response to input indicating a selection of the option without the telecommunication service carrier system 112 having to send the signal to the mobile device 116 to do so. The ad may be received by the mobile device 116 from the telecommunication service carrier system 112 over communication system 108, which may have received the ad from the advertiser system 108 over communication system 108. In some embodiments, the mobile device may receive the ad directly from the advertiser system 114 over communication system 108. One or more of such ads may have been previously stored on the mobile device 116 and thus may be selected and played instantaneously in response to the mobile device 116 receiving input indicating selection of the option.

The telecommunication service carrier system 112 then enables the telecommunication service to be used by the mobile device in response to the ad being delivered. For example, the telecommunication service carrier may add additional data service, minutes and/or text messages to a prepaid telecommunication service plan associated with the mobile device 116 and/or user in response to receiving an indication that the ad has been played on the mobile device 116.

The advertiser system 114 may include one or more systems associated with and/or that implement: storing, publishing, selecting, communicating or delivering ads, or compensating for delivery of ads and/or otherwise providing ad impressions. These may include, but are not limited to: systems of advertisers, systems of ad publishers, ad servers, systems of product manufacturers and/or service providers, systems of advertising and/or marketing agencies, systems of advertising affiliates, systems of media vendors, systems of content creators, business intelligence systems, digital media exchange systems, ad network systems, etc. One or more of the above systems, or functionality thereof, may also or instead be implemented partially or fully by the telecommunication service carrier system 112.

In some embodiments, the telecommunication service carrier system 112 may also provide compensation to a customer in the form of adding data service, minutes and/or text messages to the customer's plan for delivery of customized advertisements originating from the advertiser system 114 based on product and service preferences of the customer learned by the telecommunication service carrier system 112. For example, the telecommunication service carrier system 112 may receive consent from the user of the mobile device 116 via communication system 108 to monitor online activity of the user via use of the telecommunication service provided by the telecommunication service carrier system 112.

In some embodiments, the telecommunication service carrier system 112 may provide the product and service preferences of the customer learned by the telecommunication service carrier system 112 to the advertiser system 114. The advertiser system 114 may then select an ad targeted to the user of the mobile device 116 based on the learned product and service preferences and communicate the ad to the telecommunication service carrier system 112 and/or directly to the mobile device 116. Playing or otherwise delivering such customized targeted ads to the user of the mobile device 116 may result in larger fees or other compensation from the advertiser 114 or other publisher to the telecommunication service carrier system 112 due to increased probability that the ad will be more relevant to the particular user, and thus more effective. The telecommunication service carrier system 112 may then split between the telecommunication service carrier system 112 and the customer the compensation electronically received via the advertiser system 114 for playing the ad on the mobile device 116. The customer portion of the split includes a specified amount of cellular telecommunication service for mobile device 116 provided by the telecommunication service carrier system 112 as the compensation to the customer. In such embodiments, the telecommunication service carrier system 112 may electronically communicate via communication system 108 a statement to the mobile device 116 which indicates, for each of the advertisements delivered, the customer portion of the split that includes the specified amount of cellular telecommunication service provided by the telecommunication service carrier system 112.

Therefore, the speed, efficiency and usefulness of providing telecommunication service by computerized telecommunication service systems are improved by providing users a technical solution to receive telecommunication service when they otherwise would not have been able to without purchasing additional service.

The mobile device 116, telecommunication service carrier system 112, mobile device 118 and advertiser system 114 are operably connected to and may communicate with each other over communication system 108. Communication system 108 may include many different types of communication media. For example, communication system 108 may include communication networks or portions thereof, which implement and/or operably support one or more of the example types of electronic communication between mobile device 116, telecommunication service carrier system 112, mobile device 118 and advertiser system 114. Non-limiting examples include computer wireless fidelity (Wi-Fi) networks; cellular telephone networks, fifth generation (5G)

technology standard for broadband cellular networks; telephony systems, the Internet; internets; intranets; local area network (LAN) systems; Internet Protocol (IP) systems; cloud computing systems, short-range wireless systems (e.g., Bluetooth systems); terrestrial television systems; digital terrestrial television (DTTV) systems; digital television terrestrial broadcasting (DTTB) systems; satellite television systems, cable systems; fiber optic systems; microwave systems; asynchronous transfer mode (ATM) systems; frame relay systems; digital subscriber line (DSL) systems; Digital Video Broadcasting (DVB) systems over cable, satellite, terrestrial and mobile networks, and other radio frequency ("RF") systems and satellite systems.

In some embodiments, communications over communication system 108 may be over one or more wired communications channels (e.g., twisted pair wiring, optical fiber) and/or wireless communications channels (e.g., radio, microwave, satellite, IEEE 801.11 compliant). Networked communications channels of communication system 108 may include one or more local area networks (LANs), wide area networks (WANs), extranets, intranets, or the Internet including the Worldwide Web portion of the Internet.

The above description of the networked environment 102 and the various devices therein, is intended as a broad, non-limiting overview of an example environment in which various embodiments of systems and methods for providing telecommunication service may be implemented. FIG. 1 illustrates just one example of a networked environment 102 and the various embodiments discussed herein are not limited to such environments. In particular, networked environment 102 and the various devices therein, may contain other devices, systems and/or media not specifically described herein.

Example embodiments described herein provide applications, tools, data structures and other support to implement how a system performs providing telecommunication service in a networked environment. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described is not limited by the particular order, selection, or decomposition of steps described with reference to any particular module, component, or routine.

Figure 2:
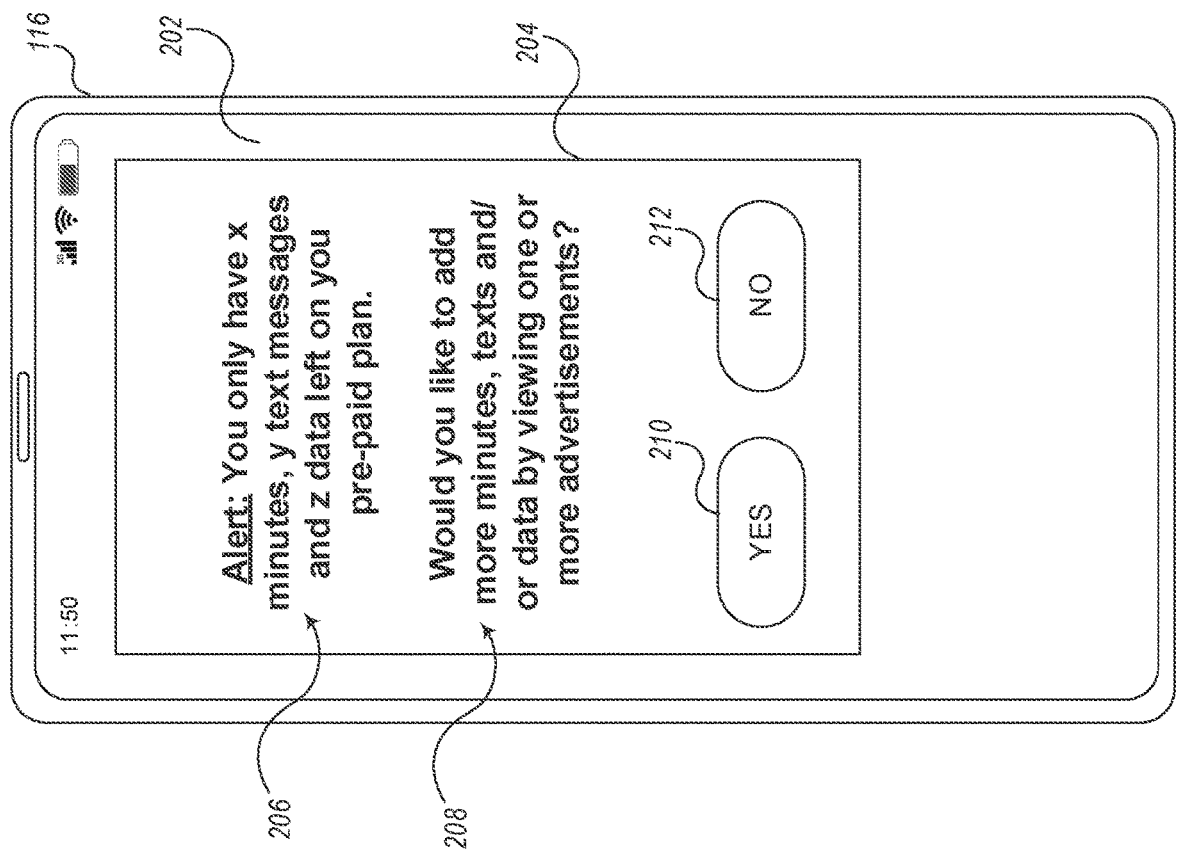
FIG. 2 is a diagram of an example user interface on a mobile device showing an example an option to a user to receive telecommunication service to the mobile device in response to having an advertisement delivered via the mobile device, according to various example embodiments.

FIG. 2 is a diagram of an example user interface 204 displayed on a touchscreen 202 of mobile device 116 showing an example option 208 to a user to receive telecommunication service to the mobile device 116 in response to having an advertisement delivered via mobile device 116, according to various example embodiments.

Shown is an alert 206 indicating to the user that an amount of telecommunication service remaining available to the mobile device 116 has fallen below a threshold amount. For example, the alert 206 indicates that there are "x minutes, y text messages and z data left on you pre-paid plan" because x minutes is below the threshold of x+1 minutes. One or more of the minutes, text messages and data falling below respective thresholds may trigger the alert 206 and/or option 208 to be presented in the user interface 204. In various embodiments, the user may set such thresholds via the user interface 204, which may be stored on the mobile device 116 and/or communicated by the mobile device 116 to the telecommunication service carrier system 112.

The option 208 provides a prompt to the user to indicate whether the user would like to add more minutes, texts and/or data for use by the mobile device by viewing one or more advertisements on the mobile device 116. In various embodiments, the user may add more minutes, texts and/or data by playing or viewing one or more advertisements on other devices.

A selectable interface element 210 is presented on the user interface 204 which the user may select (e.g., by touching the touchscreen 202) to indicate that the user would like to add more minutes, texts and/or data by viewing one or more advertisements on the mobile device 116. Selectable interface element 212 is also presented on the user interface 204 which the user may select (e.g., by touching the touchscreen 202) to indicate that the user would not like to add more minutes, texts and/or data by viewing one or more advertisements on the mobile device 116.

Figure 3:
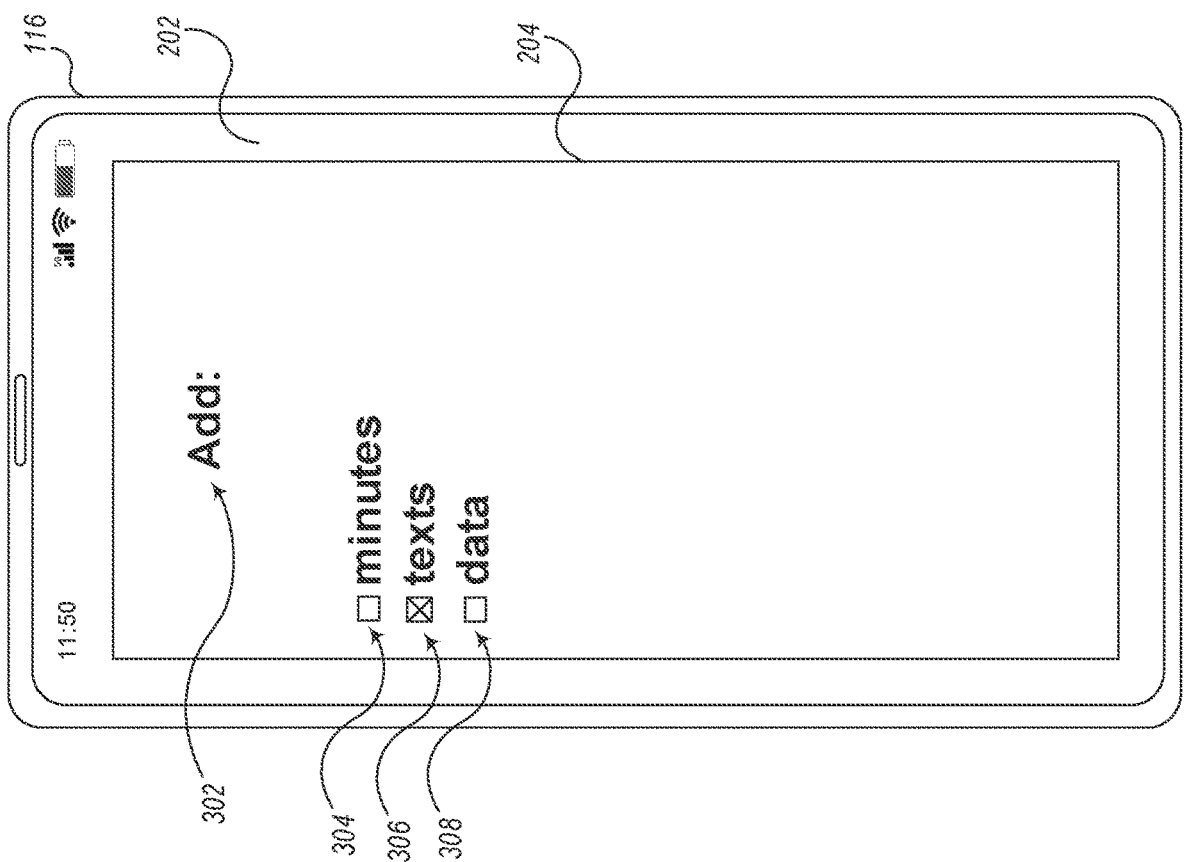
FIG. 3 is a diagram of an example user interface on a mobile device showing an example option to add minutes, texts or data displayed in response to the user selecting the option shown in FIG. 2, according to various example embodiments.

FIG. 3 is a diagram of the example user interface 204 on mobile device 116 showing an example option 302 to add minutes 304, texts 306 or data 308 displayed in response to the user selecting the option 208 shown in FIG. 2, according to various example embodiments.

In the present example, the user has selected the selectable interface element 210 of FIG. 2 to indicate that the user would like to add more minutes, texts and/or data by viewing one or more advertisements on the mobile device 116. In response, the prompt 302 to add minutes 304, texts 306 or data 308 is displayed on the user interface 204. In the present example, the user has selected to add texts 306 for viewing one or more advertisements on the mobile device 116 by touching the corresponding checkbox next to texts 306. In various embodiments, the user may select to instead or also to add minutes 304 and data 308.

Figure 4:
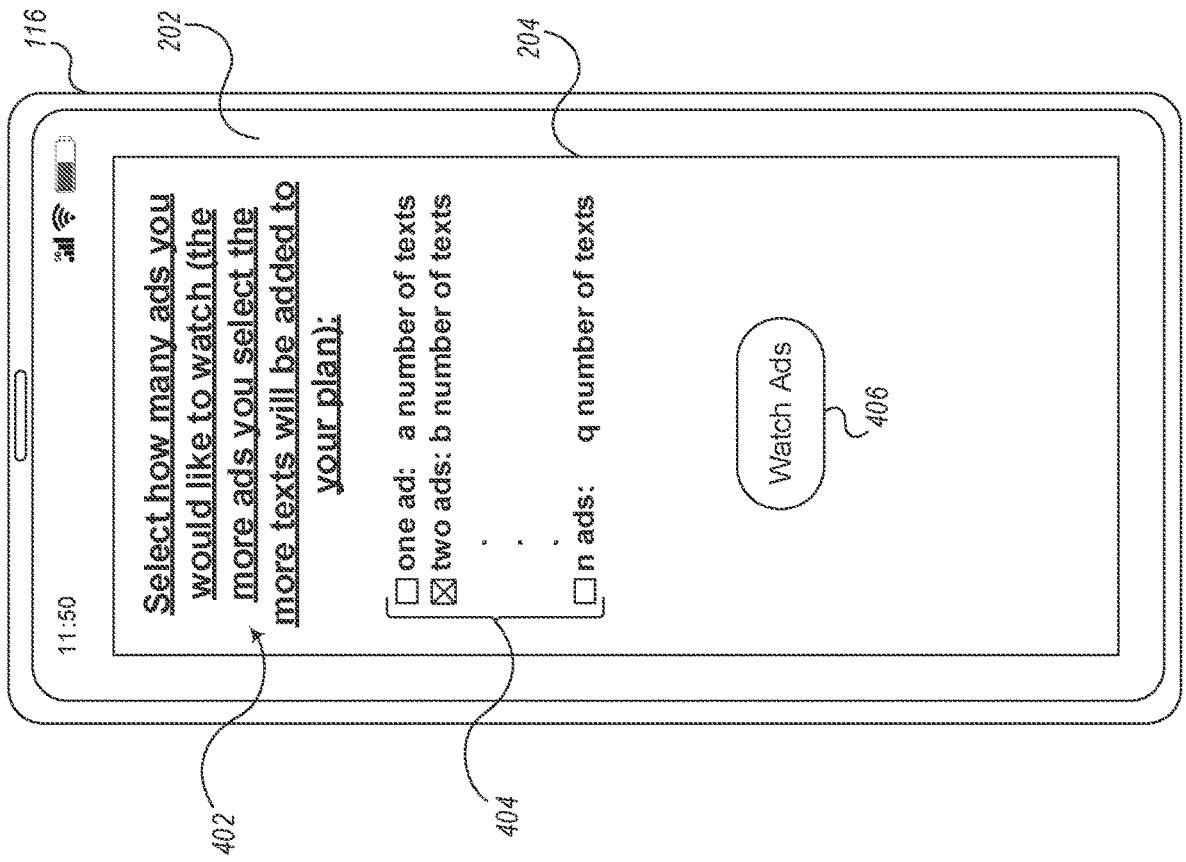
FIG. 4 is a diagram of an example user interface on a mobile device showing an example option for the user to select how many advertisements the user would like to watch to add text messages to the user's telecommunication plan in response to the user selecting the option shown in FIG. 3 to add text messages, according to various example embodiments.

FIG. 4 is a diagram of the example user interface 204 on mobile device 116 showing an example prompt 402 for the user to select how many ads the user would like to watch to add text messages to the user's telecommunication plan in response to the user selecting an option via the prompt 302 shown in FIG. 3 to add texts 306, according to various example embodiments.

In the present example, a list 404 of options is presented, wherein each option in the list 404 indicates a number of ads the user may select to watch and a corresponding number of texts that will be added to the telecommunication service plan for the mobile device 116 for watching corresponding number of ads. Based on the option previously selected by the user, the list 404 may instead indicate a corresponding number of minutes or amounts of data (e.g., in megabytes or gigabytes) that will be added to the telecommunication service plan for the mobile device 116 for watching the corresponding number of ads. In the present example, the user has selected to watch two ads and have "b" number of texts added by touching the corresponding checkbox next to that option in the list 404.

In various embodiments, different options may be presented for watching various different numbers of ads, types of ads, lengths of ads, etc., for having various different corresponding numbers of texts, amounts of data and minutes added. A selectable user interface element 406, such as a button, is also displayed for the user to select and thereby initiate playing the ads to have the texts added to the telecommunication plan of the mobile device 116. In some embodiments, merely playing of the ad on the mobile device 116 will be sufficient to have the corresponding telecommunication service added. In other embodiments, the mobile device 116 may detect and require the user actually watching or viewing the ad to have the telecommunication service added. For example, this may be detected via facial recognition functionality using a camera or other sensor on the mobile device 116 sensing the user's face in front of the camera or other sensor while the ad is being played on the mobile device 116.

Figure 5:
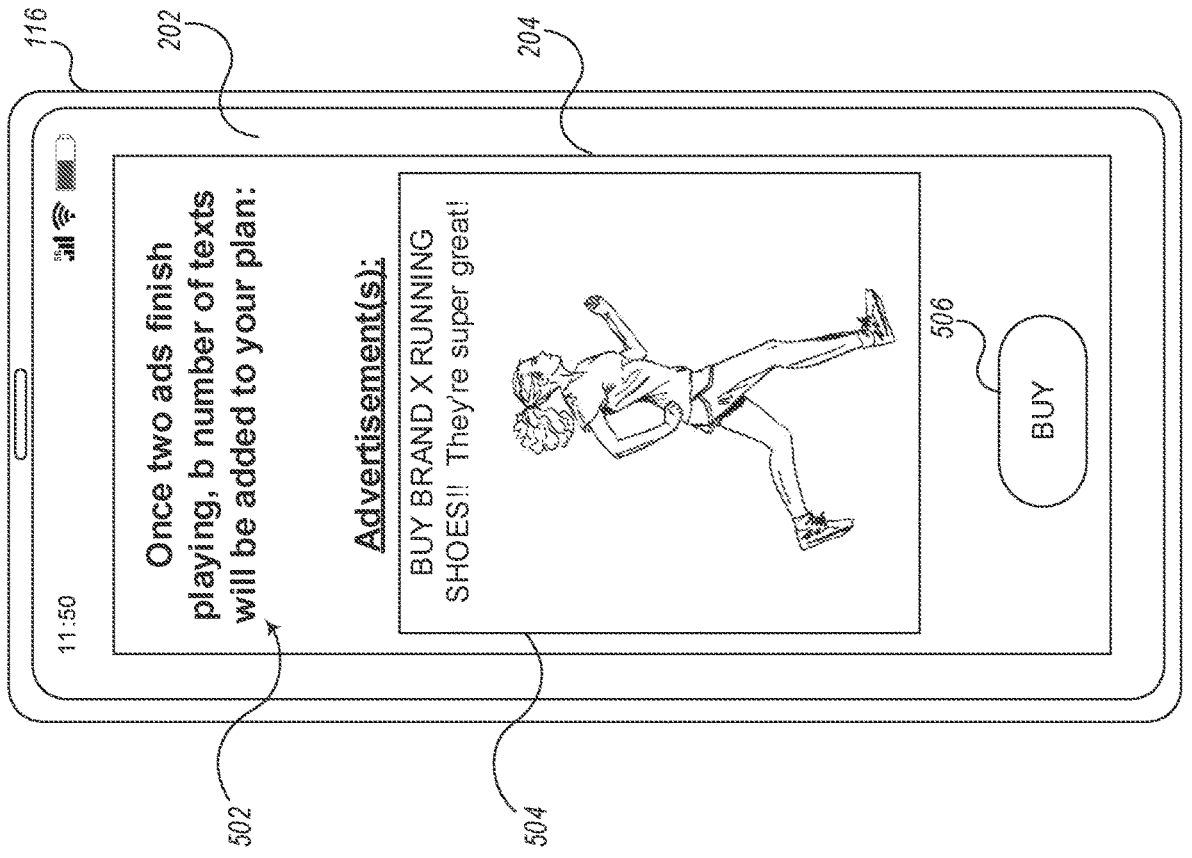
FIG. 5 is a diagram of an example user interface on a mobile device displaying advertisements in response to the user selecting the option in FIG. 4 indicating how many advertisements the user would like to watch to add text messages to the user's telecommunication plan, according to various example embodiments.

FIG. 5 is a diagram of the example user interface 204 on the mobile device 116 displaying advertisements in response to the user selecting an option in the list 404 of options of FIG. 4 indicating how many advertisements the user would like to watch to add text messages to the user's telecommunication plan and then selecting the selectable user interface element 406, to initiate playing the ads, according to various example embodiments.

Shown is an example ad 504 for running shoes showing a video or image of a person running with the advertised running shoes. The ad 504 is an example of one of many ads that may be played in succession without gaps between them or intermittently on the mobile device 116 in order to add text messages to the user's telecommunication plan on the mobile device 116. In various embodiments, the user may select to have the ads played without gaps in between playing the ads or intermittently on the mobile device 116. The ads may be provided as push messages, integrated into mobile applications, web browsers, visited web sites, games, and/or as pop-ups or banner ads on various screens, menus and/or applications as selected by the user and/or the telecommunication service carrier system 112.

Prompt 502 indicates to the user that after the selected number of ads have finished playing, the corresponding number of texts will be added to the telecommunication service plan associated with the mobile device 116. This addition of text messages may occur in real time immediately after selected number of ads have finished playing such that the user may immediately start using the added service. Also provided is an optional selectable user interface element 506 which the user may select to buy, or otherwise find out more information about, the product or service being advertised in the ad 504. In some embodiments, buying the product or service via selecting the selectable user interface element 506 or otherwise selecting the selectable user interface element 506 to find out more information about the product or service being advertised in the ad 504 may result in additional telecommunication service being immediately added to the telecommunication service plan associated with the mobile device 116.

Figure 6:
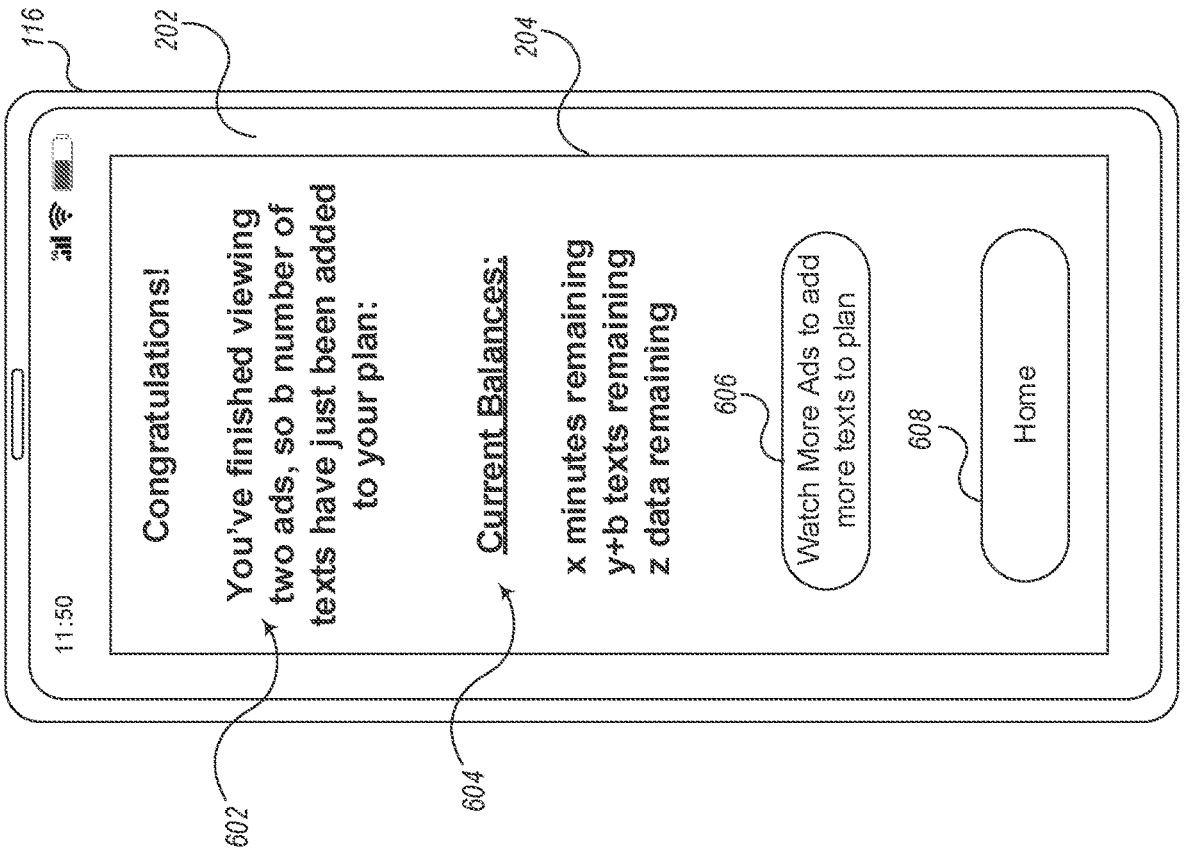
FIG. 6 is a diagram of an example user interface on a mobile device displaying current balances of various telecommunication services after adding a number of text messages in response to the mobile device displaying the advertisements in FIG. 5, according to various example embodiments.

FIG. 6 is a diagram of the example user interface 204 mobile device 116 displaying current balances of various telecommunication services after adding a number of text messages in response to the mobile device 116 displaying the advertisements in FIG. 5, according to various example embodiments.

Shown is a message 602 displayed on the user interface 204 indicating that the user has finished viewing two ads, so "b" number of texts have just been added to the user's telecommunication service plan, which is associated with the mobile device 116 and possibly also the user. Also shown on the user interface 204 is a statement 604 showing the current balances of the minutes, texts and data remaining on the telecommunication service plan after adding "b" text messages in response to the mobile device 116 displaying the advertisements in FIG. 5. Thus, the total amount of text messages available for use is "y" (the previous amount) plus "b" (the amount added in response to displaying the advertisements). Also displayed on the user interface 204 is a selectable user interface element 606 that the user may select to watch more ads to add more texts to the user's telecommunication service plan and a selectable user interface element 608 that the user may select to return to a home screen of the user interface 204 of the mobile device 116.

In the present example embodiment, the ad 504 is presented and thus viewed and/or heard on the same mobile device 116 from which calls are made, messages are sent and data is used via the telecommunication service carrier system 112. In response to the ad 504 being presented, additional calls may be made, additional messages may be sent and/or additional data may be used via the telecommunication service carrier system 112 on the same mobile device 116 that received the ad 504 and on which the ad 504 was presented. However, in other embodiments, the ad 504 may be presented and thus viewed and/or heard on a different mobile device 116 from which calls are made, messages are sent and data is used. Also, in other embodiments, the additional minutes, text messages and data in response to the ad 504 being presented on mobile device 116 may be used on another device associated with the user or transferred to another user or device.

Figure 7:
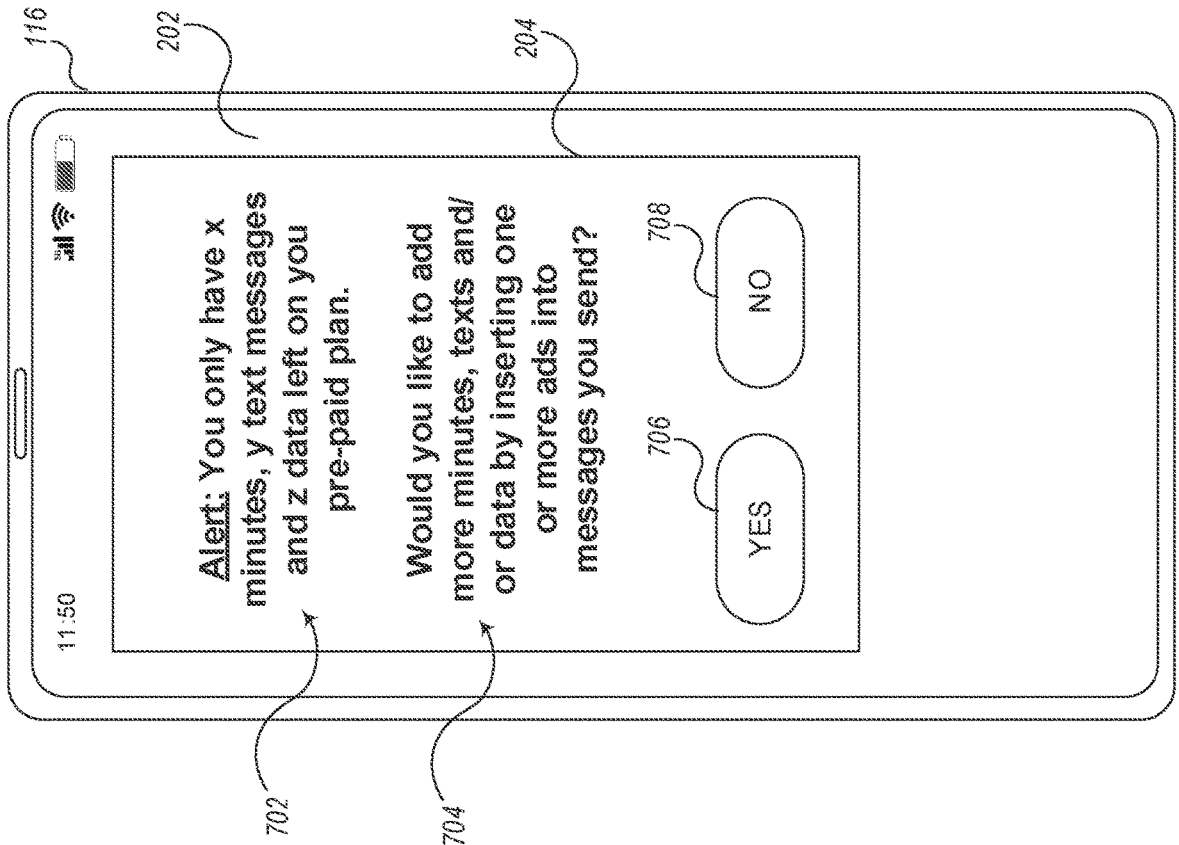
FIG. 7 is a diagram of an example user interface on a mobile device showing an example option to a user to receive telecommunication service to the mobile device in response to inserting advertisements into messages the user sends, according to various example embodiments.

FIG. 7 is a diagram of the example user interface 204 on mobile device 116 showing an example option 704 to a user to receive telecommunication service to the mobile device 116 in response to inserting advertisements into messages the user sends, according to various example embodiments.

Shown is an alert 702 indicating to the user that an amount of telecommunication service remaining available to the mobile device 116 has fallen below a threshold amount. The option 704 provides a prompt to the user to indicate whether the user would like to add more minutes, texts and/or data by inserting one or more ads into messages the user send's via the mobile device 116. For example, when the user hits send on a text message the mobile device 116 or the telecommunication service carrier system 112 may insert an ad or a link to an ad in the text message such that the recipient must view the ad or the link to the ad in order to read the text message.

A selectable interface element 706 is presented on the user interface 204 which the user may select (e.g., by touching the touchscreen 202) to indicate that the user would like to add more minutes, texts and/or data by inserting one or more ads into messages the user send's via the mobile device 116. Selectable interface element 212 is also presented on the user interface 204 which the user may select (e.g., by touching the touchscreen 202) to indicate that the user would not like to add more minutes, texts and/or data by inserting one or more ads into messages the user send's via the mobile device 116.

Figure 8:
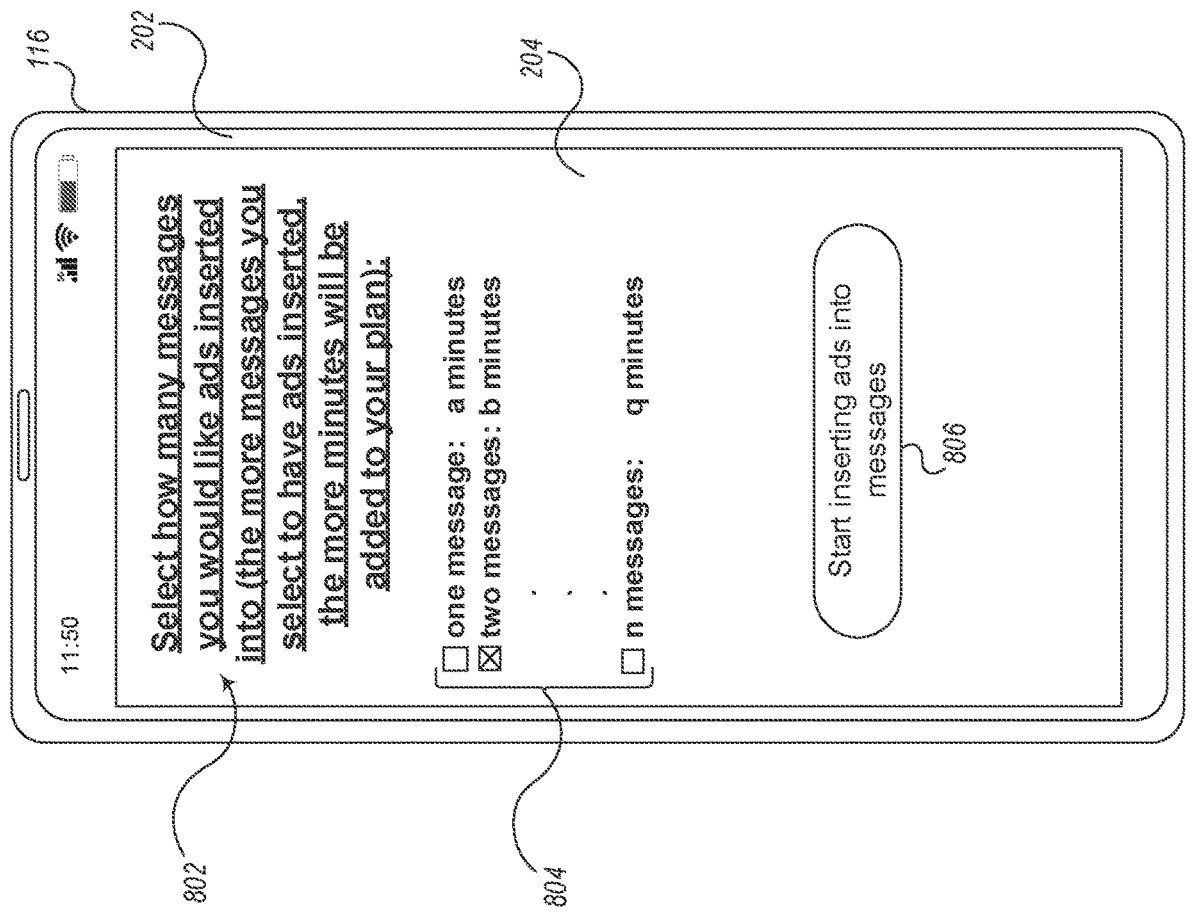
FIG. 8 is a diagram of an example user interface on a mobile device showing an example option for the user to select how many of their messages the user would like advertisements inserted into to have minutes added in response to the user selecting the option shown in FIG. 7 and to add minutes, according to various example embodiments.

FIG. 8 is a diagram of the example user interface 204 on the mobile device 116 showing an example option 802 for the user to select how many of their messages the user would like advertisements inserted into to have minutes added in response to the user selecting the option shown in FIG. 7 and to add minutes, according to various example embodiments.

In the present example, a list 804 of options is presented, wherein each option in the list indicates a number of messages the user may select to have ads inserted into and a corresponding number of minutes that will be added to the telecommunication service for the mobile device 116 for having ads inserted into the indicated number of messages. In the present example, the user has selected to have two messages have ads inserted in to them to receive an additional "b" minutes of service by selecting the checkbox next to that option in the list 804.

A selectable user interface element 806, such as a button, is also displayed for the user to select and thereby initiate inserting the ads when the user sends messages via the mobile device 116 to have the minutes added to the telecommunication plan of the mobile device 116.

Figure 9:
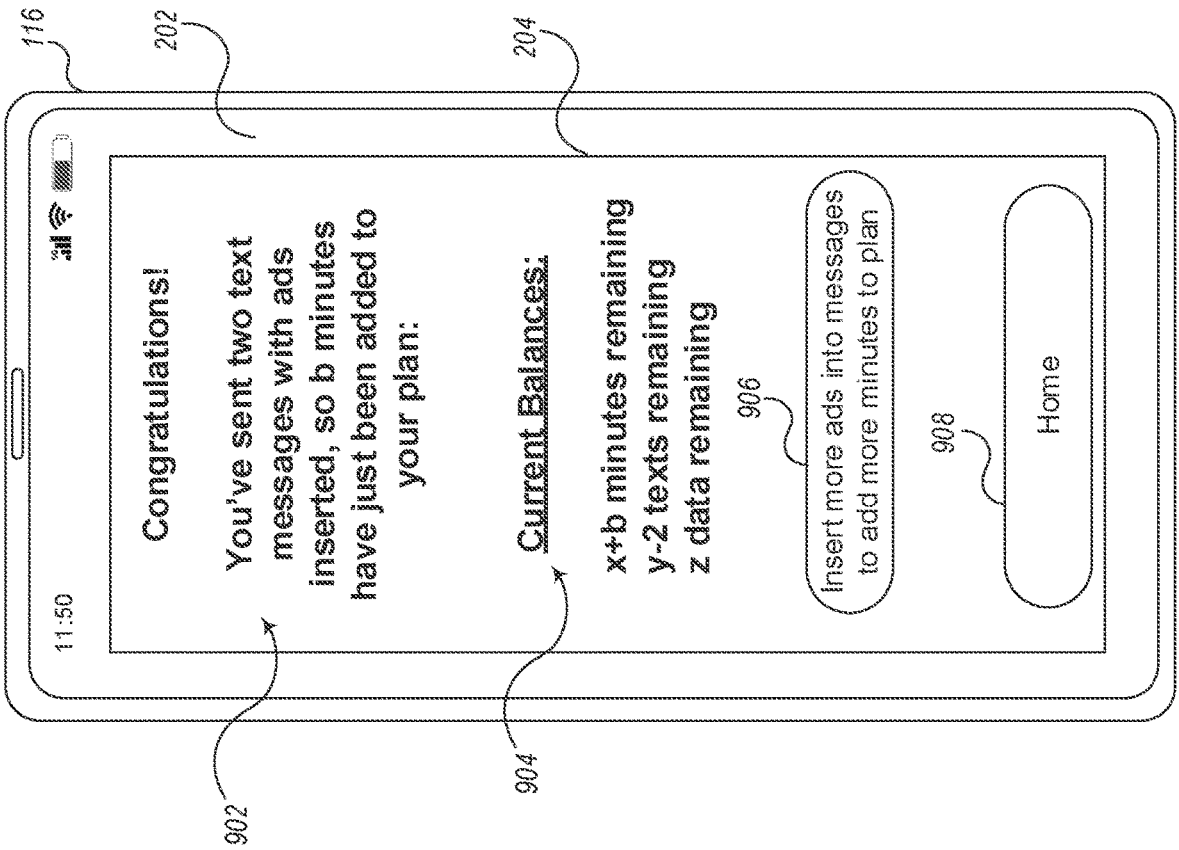
FIG. 9 is a diagram of an example user interface on a mobile device displaying current balances of various telecommunication services after adding a number of minutes in response to sending text messages having inserted advertisements based on the option selected in FIG. 8, according to various example embodiments.

FIG. 9 is a diagram of the example user interface 204 on mobile device 116 displaying current balances of various telecommunication services after adding a number of minutes in response to sending text messages having inserted ads based on the option selected in FIG. 8, according to various example embodiments.

Shown is a message 902 displayed on the user interface 204 indicating that the user has two text messages with ads inserted, so b minutes have been added to the user's telecommunication service plan. Also shown on the user interface 204 is a statement 904 showing the current balances of the minutes, texts and data remaining on the telecommunication service plan after adding "b" minutes in response to the mobile device 116 inserting the ads into two messages sent by the user as selected in FIG. 8. Thus, the total number of minutes available for use is "x" (the previous amount) plus "b" (the amount added in response to inserting the advertisements into the messages). Also, the total number of text messages is shown as being decreased by 2 for the two messages that were sent which had ads inserted. However, in some embodiments, the telecommunication service carrier system 112 may also or instead provide free text messages without deducting the number of messages remaining on the plan when ads are inserted into those messages.

Also displayed on the user interface 204 is a selectable user interface element 906 that the user may select to insert more ads into messages the user sends to add more minutes or other service to the user's telecommunication service plan and a selectable user interface element 908 that the user may select to return to a home screen of the user interface 204 of the mobile device 116.

Figure 10:
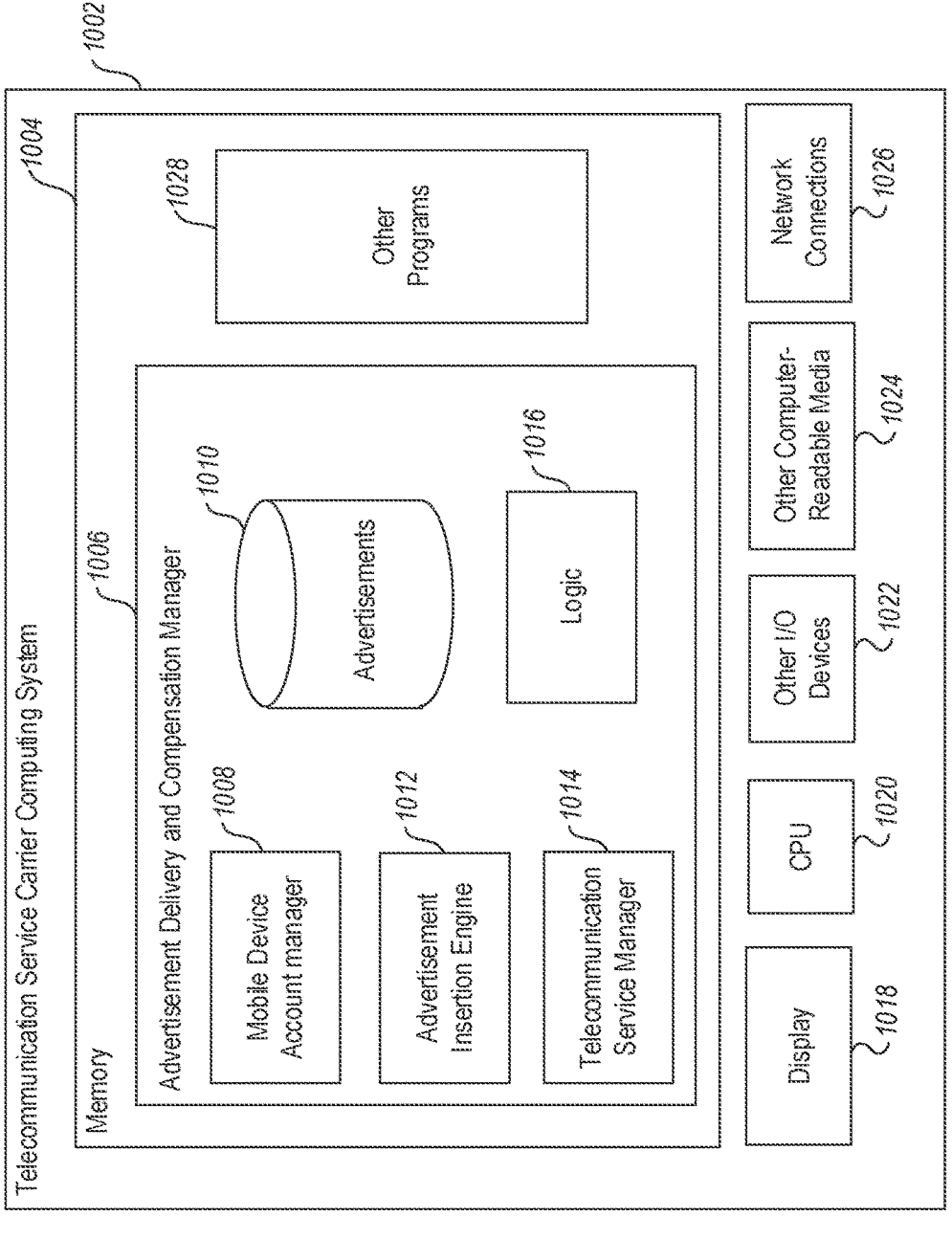
FIG. 10 is a block diagram of an example telecommunication service carrier computing system, according to various example embodiments.

FIG. 10 is a block diagram of an example telecommunication service carrier computing system 1002, according to various example embodiments.

For example, the telecommunication service carrier computing system 1002 may be that of the telecommunication service carrier system 112 and used to implement the systems and methods for providing telecommunication service disclosed herein. Some or all of the device, components and functionality of the telecommunication service carrier computing system 1002 may also or instead be included in any of the systems shown in FIG. 1 as applicable to implement the functionality of those systems disclosed herein and the systems and methods for providing telecommunication service disclosed herein.

The telecommunication service carrier computing system 1002 may be utilized to implement an advertisement delivery and compensation manager 1006 of the telecommunication service carrier computing system 1002. The advertisement delivery and compensation manager 1006 implements the processes and algorithms described herein for providing telecommunication service involving the various devices shown in FIG. 1. For example, the advertisement delivery and compensation manager 1006 may include or implement components of a mobile device account manager 1008, an advertisement insertion engine 1012, a telecommunication service manager 1014, and other components implemented by logic 1016 such as cellular telecommunication systems and interfaces, computer networking systems and interfaces, machine learning or other AI models, application programming interfaces (APIs) or other system modules that perform the algorithms described herein for providing telecommunication service. Each system shown in FIG. 1 may have its own version of the advertisement delivery and compensation manager 1006 that implements the processes and algorithms that the respective system performs as described herein. One or more general purpose or special purpose computing systems/devices may be used to implement the advertisement delivery and compensation manager 1006. In addition, telecommunication service carrier computing system 1002 may comprise one or more distinct computing systems/devices and may span distributed locations. Furthermore, each block shown may represent one or more such blocks as appropriate to a specific embodiment or may be combined with other blocks. Also, the advertisement delivery and compensation manager 1006 may be implemented in software, hardware, firmware, or in some combination to achieve the capabilities described herein.

In the embodiment shown, telecommunication service carrier computing system 1002 comprises a computer memory ("memory") 1004, a user interface display 1018 (which may be a touchscreen in some embodiments), one or more Central Processing Units ("CPUs") 1020 (which may also include one or more graphics processing units (GPUs)), other input/output devices 1022 (e.g., a video camera, a microphone, sensor, touchscreen, keyboard, mouse, RF or infrared receiving device, CRT or LCD display, and the like), other computer-readable media 1024, and network connections 1026. Network connections 1026 represent the communication modules, interfaces, modems, network adapters, tuners, radios, receivers, transceivers, demodulators, demultiplexers, packet filters, network equipment, etc., of telecommunication service carrier computing system 1002 that are configured and operable to receive data from and interface with the systems of FIG. 1 described herein over communication system 108.

The advertisement delivery and compensation manager 1006 is shown residing in memory 1004. In other embodiments, some portion of the contents and some of or all of the components of the advertisement delivery and compensation manager 1006 may be stored on and/or transmitted over the other computer-readable media 1024. The components of the advertisement delivery and compensation manager 1006 execute on one or more CPUs 1020 and cause the algorithms shown in FIGS. 11-16 and other algorithms described herein to be performed.

Other code or programs 1028 (e.g., video processing applications, social media applications, Internet applications, an operating system, a network layer stack, graphics programs, application programming interfaces (APIs) and the like) and potentially other data repositories, also reside in the memory 1004, and may execute on one or more CPUs 1020. Of note, one or more of the components in FIG. 10 may not be present in any specific implementation. For example, some embodiments may not provide other computer readable media 1024.

In some embodiments, the advertisement delivery and compensation manager 1006 may include a mobile device account manager 1008, an advertisement insertion engine 1012, a telecommunication service manager 1014, and logic 1016 that includes the program code to implement the methods, including the processes and algorithms described herein, for implementing providing telecommunication service and which may be performed by the advertisement delivery and compensation manager 1006. Other and/or different modules may be implemented. The advertisement delivery and compensation manager 1006 may interact via network connections 1026 with the other systems shown in FIG. 1 and various other devices not shown in FIG. 1 via the communication system 108 shown in FIG. 1.

The mobile device account manager 1008 stores and manages telecommunication service plans associated with various mobile devices, such as mobile device 116 and mobile device 118 and, in some embodiments, users associated with those devices. Such plans may be prepaid plans in various embodiments and the mobile device account manager 1008 may update such plans by tracking telecommunication services used (e.g., minutes, data and text messages) and add telecommunication services available to mobile devices in response to the advertisement insertion engine 1012 delivering or detecting delivering of ads to the corresponding mobile devices associated with the individual plans as described herein. For example, the advertisement insertion engine 1012 may select an ad stored in the advertisements storage 1010 to be played on a particular mobile device in response to receiving a request from the mobile device, may send via telecommunication service manager 1014 an ad to a mobile device to be played on the mobile device, may insert an ad into a message sent from a mobile device via telecommunication service manager 1014, and/or may detect that an ad has been received, played on or otherwise delivered to a particular mobile device via telecommunication service manager 1014. The advertisements storage 1010 may be periodically updated with ads via the advertiser system 114.

In an example embodiment, components or modules of the advertisement delivery and compensation manager 1006 are implemented using a particular programming technique. For example, the advertisement delivery and compensation manager 1006 may be implemented as a "native" executable running on the CPU 1020, along with one or more static or dynamic libraries. In other embodiments, the advertisement delivery and compensation manager 1006 may be implemented as instructions processed by a virtual machine that executes as one of the other programs 1028. In general, a range of programming languages may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

In a software or firmware implementation, instructions stored in a memory cause, when executed, one or more processors of telecommunication service carrier computing system 1002 to perform the functions of the advertisement delivery and compensation manager 1006. For example, instructions stored in memory when executed by a computer processor modify the data in the same or another memory address space, thus performing the functions of the advertisement delivery and compensation manager 1006. Alternatively, instructions stored in memory when executed by a processor, could modify the control registers of an application specific integrated circuit (ASIC) to configure it to perform the functions of the advertisement delivery and compensation manager 1006. Such an ASIC may directly access and modify the memory of the computer processor without the intervention of the computer processor (DMA operation). The CPU 1020 or other processor may be configured to perform other operations such as processing and integrating other types of media content received by the telecommunication service carrier computing system 1002 and/or sent to the mobile device 116.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Also, functions could be implemented and/or performed by each component/module, and in different orders, and by different components/modules, yet still achieve the functions of the advertisement delivery and compensation manager 1006. For example, one way (broadcast) and/or two-way (interactive) wide area networks (WAN) may be used for electronic communication. Both types of networks may use storage local to one or more of the systems shown in FIG. 1 and under local control on the local area network (LAN).

In addition, programming interfaces to the data stored as part of the advertisement delivery and compensation manager 1006, such as in the advertisements storage 1010 and mobile device account manager 1008, can be available by standard mechanisms such as through C, C++, C#, and Java APIs; libraries for accessing files, databases, or other data repositories; through scripting languages such as XML; or through Web servers, FTP servers, or other types of servers providing access to stored data. The advertisements storage 1010 and mobile device account manager 1008 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of a short-hand item processing manager.

Furthermore, in some embodiments, some or all of the components of the advertisement delivery and compensation manager 1006 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on, or transmitted/communicated by, various non-transitory or transitory computer-readable mediums (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

One or more of the same or similar computing system and implementation technologies described above with respect to telecommunication service carrier computing system 1002 and implementation of the advertisement delivery and compensation manager 1006 may be utilized by any of the systems shown in FIG. 1 as applicable to implement the functions of the system for providing telecommunication service described herein.

In various embodiments, any of the operations described with respect to the following flow diagrams may be performed by the mobile device 116 and/or the telecommunication service carrier system 112.

Figure 11:
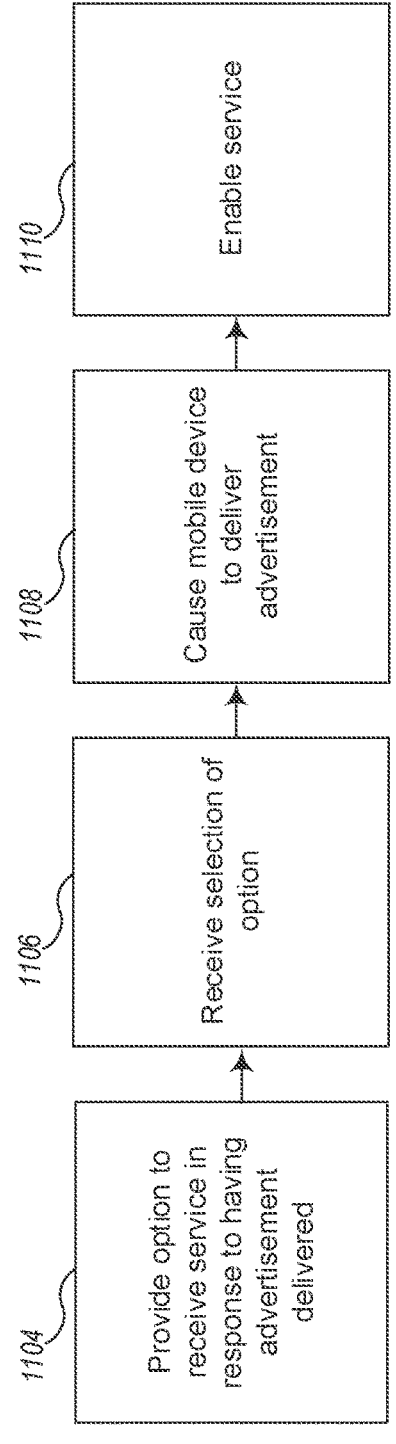
FIG. 11 is a flow diagram of an example method for providing telecommunication service involving enabling the telecommunication service to be used by a mobile device in response to delivering of an advertisement, according to various example embodiments.

FIG. 11 is a flow diagram of an example method 1102 for providing telecommunication service involving enabling the telecommunication service to be used by a mobile device in response to delivering of an advertisement, according to various example embodiments.

At 1104, system electronically provides an option to a user to receive telecommunication service to a mobile device of the user in response to having an advertisement delivered via the mobile device. The option may be provided via one or more of: a text message, a pop-up message, a chat message, an email, a push notification and a voicemail message to the mobile device indicating the determined amount of telecommunication service remaining available to the mobile device has fallen below the threshold amount and a selectable user interface element to select the option.

At 1106, the system electronically receives input indicating a selection of the option.

At 1108, the system, based on receiving the input, electronically causes the mobile device to electronically deliver the advertisement. The delivery of the advertisement may include electronically causing the mobile device to perform one or more of: playing a video advertisement on the mobile device; playing an audio advertisement on the mobile device; displaying an advertisement image on the mobile device; displaying a textual advertisement on the mobile device; and displaying an advertisement link on the mobile device. In some embodiments, delivery of the advertisement may include electronically causing the mobile device to insert one or more of the following in a message originating from the mobile device to a recipient: a video advertisement; an audio advertisement; an advertisement image; a textual advertisement; and an advertisement link.

In some embodiments, the system may select the advertisement from an advertisement server based on the input; electronically transmit the advertisement to the mobile device from the advertisement server; and electronically send a signal to the mobile device to present the advertisement.

At 1110, the system electronically enables the telecommunication service to be used by the mobile device in response to the delivering of the advertisement. For example, the system may electronically receive an indication that the advertisement was electronically delivered. In response to receiving the indication that the advertisement was electronically delivered, the system may automatically increase an indication of an amount of remaining telecommunication service available to the mobile device in an electronic telecommunication service account associated with the mobile device. In some embodiments, the increased indication of the amount of remaining telecommunication service available to the mobile device is associated with and accessible via a card that has an identifier associated with the increased amount of remaining telecommunication service.

Figure 12:
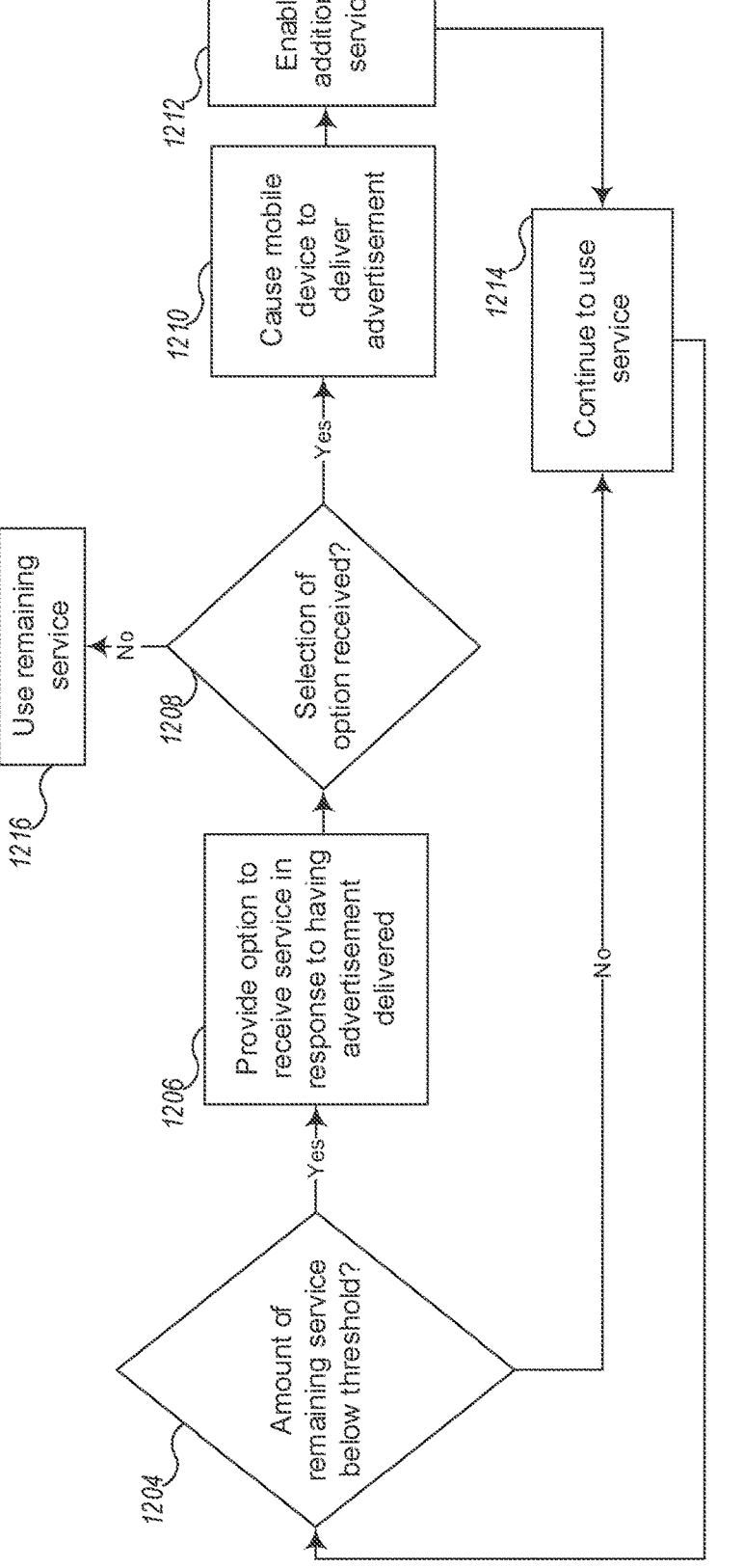
FIG. 12 is a flow diagram of an example method for providing telecommunication service involving providing an option to a user based on a determined amount of telecommunication service remaining available to the mobile device falling below a threshold amount, according to various example embodiments.

FIG. 12 is a flow diagram of an example method 1202 for providing telecommunication service involving providing an option to a user based on a determined amount of telecommunication service remaining available to the mobile device falling below a threshold amount, according to various example embodiments.

At 1204, the system determines whether an amount of telecommunication service remaining available to a mobile device has fallen below a threshold amount. If it is determined that the amount of telecommunication service remaining available to a mobile device has fallen below a threshold amount, the method proceeds to 1206. If it is determined that the amount of telecommunication service remaining available to a mobile device has not fallen below a threshold amount, the method proceeds to 1214.

At 1206, the system electronically provides an option to the user to receive telecommunication service to the mobile device of the user in response to having an advertisement delivered via the mobile device.

At 1208, the system determines whether input indicating selection of the option has been received. If it is determined input indicating selection of the option has been received, then the method proceeds to 1210. If it is determined input indicating selection of the option has not been received, then the method proceeds to 1216.

At 1216, the remaining service available for the mobile device is used.

At 1210, the system causes the mobile device to electronically deliver the advertisement.

At 1212, the system the system electronically enables additional telecommunication service to be used by the mobile device in response to the delivering of the advertisement.

At 1214, the system the service available to the mobile device continues to be used before proceeding to 1204 to again determine whether an amount of telecommunication service remaining available to the mobile device has fallen below a threshold amount. This determination may be made periodically or may be triggered by the amount of telecommunication service remaining available to the mobile device falling below a threshold amount.

Figure 13:
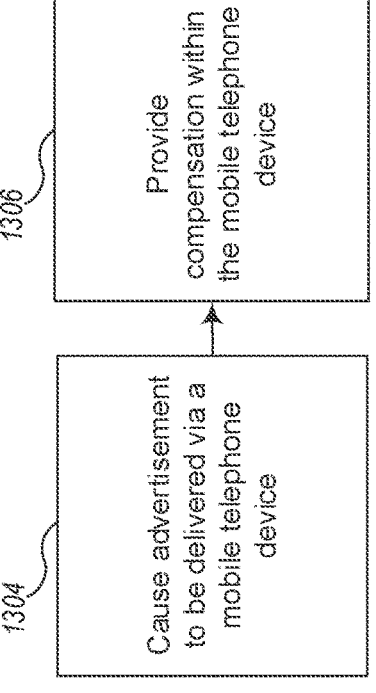
FIG. 13 is a flow diagram of an example method involving providing compensation to a customer of a telecommunication service carrier for causing an advertisement to be delivered associated with the customer, according to various example embodiments.
Figure 13:

FIG. 13 is a flow diagram of an example method 1300 involving providing compensation to a customer of a telecommunication service carrier for causing an advertisement to be delivered associated with the customer, according to various example embodiments.

At 1304, the system causes one or more advertisements associated with a customer of a telecommunication service carrier to be electronically delivered via a mobile telephone device of the customer to which the telecommunication service carrier provides telecommunication service.

At 1306, the system electronically provides compensation to the customer within the mobile telephone device by enabling a particular amount of additional use of the telecommunication service by the mobile telephone device in response to the one or more advertisements associated with the customer being electronically delivered via the mobile telephone device.

Figure 14:
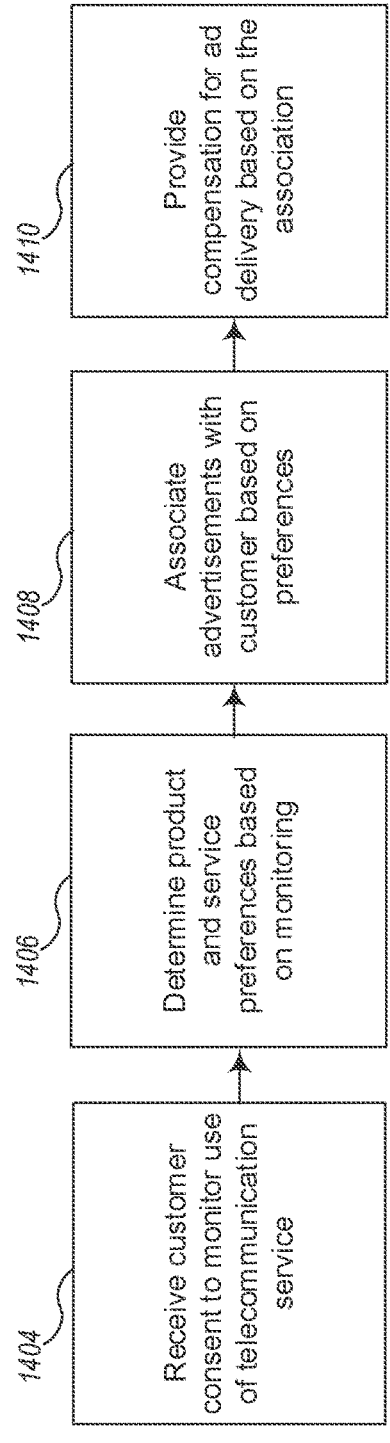
FIG. 14 is a flow diagram of an example method involving providing compensation to a customer for delivery of an advertisement that is based on determined product and service preferences of the customer, according to various example embodiments.

FIG. 14 is a flow diagram of an example method 1400 involving providing compensation to a customer for delivery of an advertisement that is based on determined product and service preferences of the customer, according to various example embodiments.

At 1404, system receives electronic consent from the customer to monitor use of the telecommunication service by the customer.

At 1406, the system determines product and service preferences based on monitoring the use.

At 1408, the system associates the one or more advertisements with the customer based on the determined product and service preferences.

At 1410, the system electronically provides the compensation to the customer at least partially based on the association of the one or more advertisements with the customer based on the determined product and service preferences.

Figure 15:
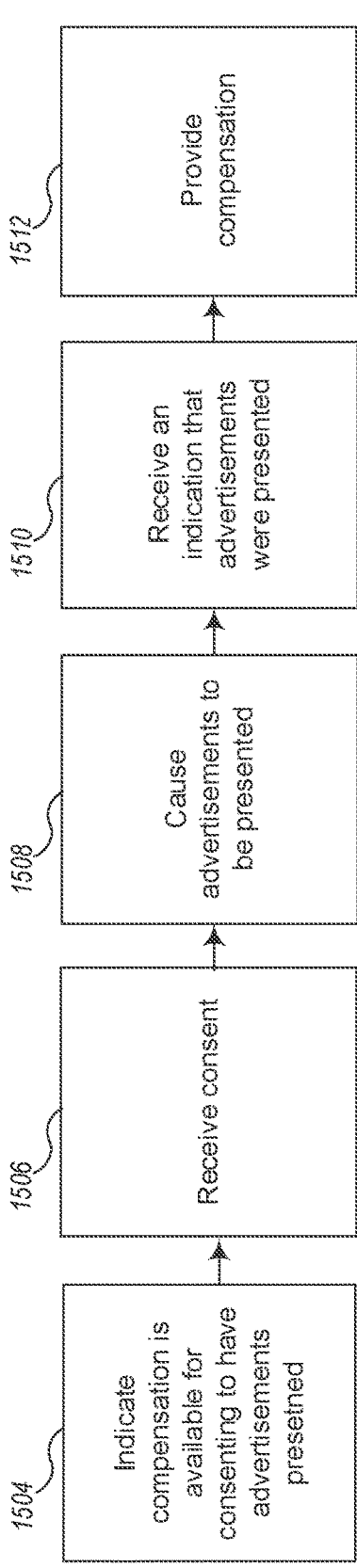
FIG. 15 is a flow diagram of an example method involving providing compensation based on receiving consent to have advertisements presented on one or more devices while the one or more devices are being viewed, according to various example embodiments.

FIG. 15 is a flow diagram of an example method 1502 involving providing compensation based on receiving consent to have advertisements presented on one or more devices while the one or more devices are being viewed, according to various example embodiments.

At 1504, the system indicates, via a device that receives telecommunication service from a telecommunication service carrier, that a specific amount of compensation is available for electronically consenting to have one or more advertisements be immediately presented on one or more devices via the telecommunication service carrier.

At 1506, the system receives the consent via the device.

At 1508, the system, in response to receiving the consent, immediately causes the one or more advertisements to be presented on the one or more devices video.

At 1510, the system receives an indication that the one or more advertisements have been presented on the one or more devices while the one or more devices are being viewed.

At 1512, the system electronically provides the specific amount of compensation to a customer of the telecommunication service in response to receiving the indication that the one or more advertisements have been presented on the one or more devices.

Figure 16:
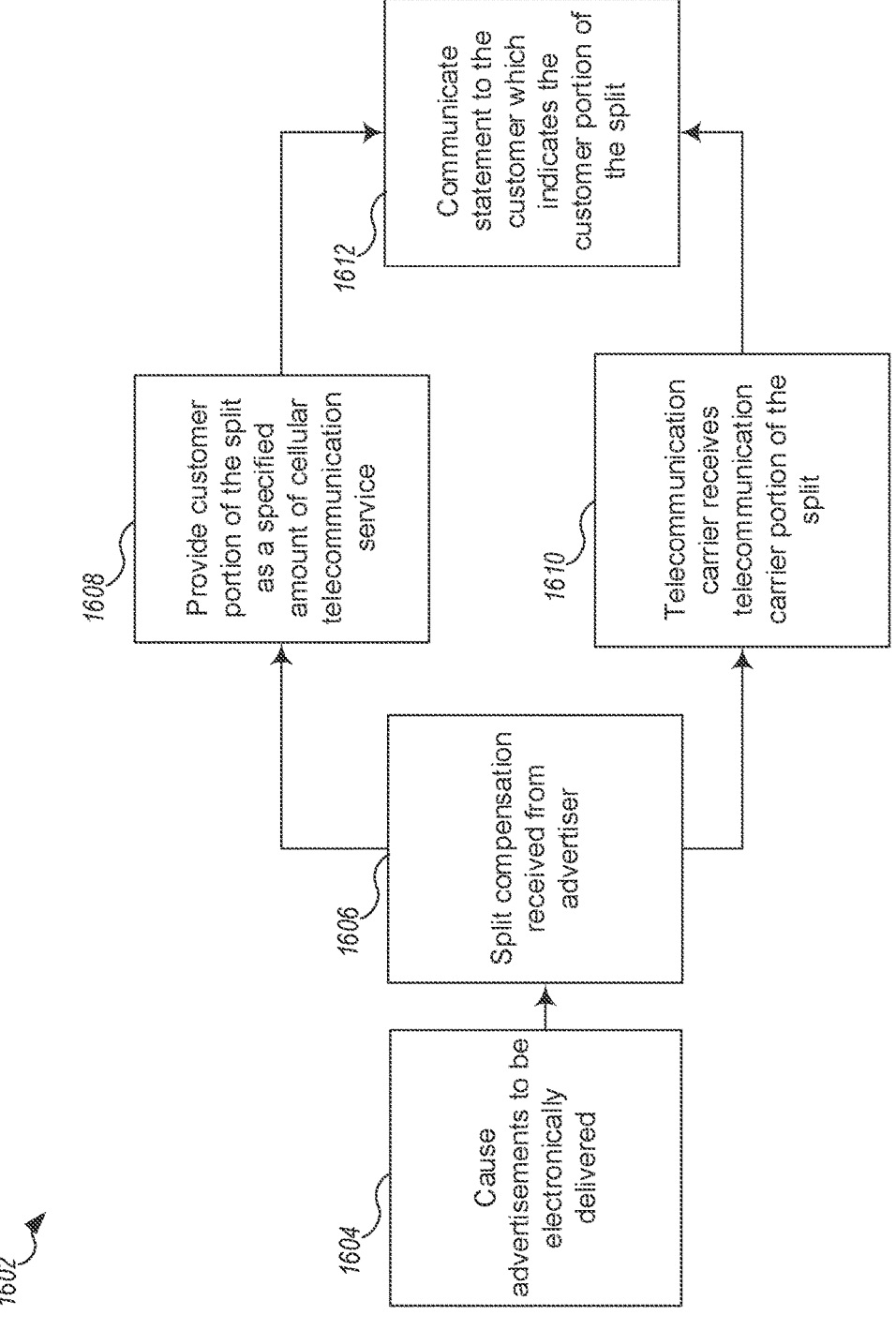
FIG. 16 is a flow diagram of an example method involving splitting compensation received from a system of an advertiser between the telecommunication service carrier and the customer, according to various example embodiments.

FIG. 16 is a flow diagram of an example method 1602 involving splitting compensation received from a system of an advertiser between the telecommunication service carrier and the customer, according to various example embodiments.

At 1604, the system causes one or more advertisements to be delivered from an advertiser via a mobile device to which a telecommunication carrier provides telecommunication service.

At 1606, the system electronically splits compensation received from a system of the advertiser between the telecommunication service carrier and a customer associated with the mobile device.

At 1608 the system electronically provides the customer portion of the split as a specified amount of cellular telecommunication service provided by the telecommunication service carrier as the compensation to the customer.

At 1610 the system causes the telecommunication carrier to receive the telecommunication carrier portion of the split.

At 1612, the system electronically communicates a statement to the customer which indicates, for each of the one or more advertisements delivered, the customer portion of the split that includes the specified amount of cellular telecommunication service provided by the telecommunication service carrier as the compensation to the customer. In various embodiments, the compensation includes one or more of: telecommunication service, cellular telecommunication service, internet service, telecommunication service upgrades, data service, data service upgrades, text messaging service, subscription to a social media account or service, telephone service, online chat service, electronic messaging service, video conferencing service, television service, cable service, satellite service, satellite phone service, voice over internet protocol (VoIP) service, electronic communication service and utility service.

According to one embodiment, a computer implemented method in a telecommunication service system is provided. The method comprises: electronically providing, by at least one computer processor, an option to a user to enable telecommunication service to be active for a mobile device of the user in response to having an advertisement delivered via the mobile device; electronically receiving, by at least one computer processor, input indicating a selection of the option to receive an advertisement delivered to the user via the mobile device; based on receiving the input of selection of the option, electronically causing, by at least one computer processor, the mobile device to electronically deliver the advertisement for receipt by the user; and electronically enabling, by at least one computer processor, the telecommunication service to be active for use by the mobile device in response to the delivering of the advertisement to the mobile device.

According to one embodiment, the method further comprises: electronically determining an amount of telecommunication service remaining available to the mobile device; and electronically providing the option to the user based on the determined amount of telecommunication service remaining available to the mobile device.

According to one embodiment, the electronically providing the option to the user based on the determined amount of telecommunication service remaining available to the mobile device includes: electronically providing the option to the user based on the determined amount of telecommunication service remaining available to the mobile device falling below a threshold amount.

According to one embodiment, the electronically providing the option to the user further includes: electronically providing via one or more of a text message, a pop-up message, a chat message, an email, a push notification and a voicemail message to the mobile device indicating the determined amount of telecommunication service remaining available to the mobile device has fallen below the threshold amount and a selectable user interface element to select the option.

According to one embodiment, the telecommunication service is one or more of: cellular telephone minutes, cellular text messaging service, and cellular internet data service.

According to one embodiment, the electronically providing the option to a user includes: electronically providing the option to the user via the mobile device of the user.

According to one embodiment, the electronically causing the mobile device to electronically deliver the advertisement includes: electronically causing the mobile device to perform one or more of: playing a video advertisement on the mobile device; playing an audio advertisement on the mobile device; displaying an advertisement image on the mobile device; displaying a textual advertisement on the mobile device; and displaying an advertisement link on the mobile device.

According to one embodiment, the electronically causing the mobile device to electronically deliver the advertisement includes: electronically causing the mobile device to insert one or more of the following in a message originating from the mobile device to a recipient: a video advertisement; an audio advertisement; an advertisement image; a textual advertisement; and an advertisement link.

According to one embodiment, the electronically causing the mobile device to electronically deliver the advertisement includes: selecting the advertisement from an advertisement server based on the input; and electronically transmitting the advertisement to the mobile device from the advertisement server; and electronically sending a signal to the mobile device to present the advertisement.

According to one embodiment, the electronically enabling telecommunication service to be used by the mobile device in response to the delivering of the advertisement includes: electronically receiving an indication that the advertisement was electronically delivered; and in response to receiving the indication that the advertisement was electronically delivered, automatically increasing an indication of an amount of remaining telecommunication service available to the mobile device in an electronic telecommunication service account associated with the mobile device.

According to one embodiment, the increased indication of the amount of remaining telecommunication service available to the mobile device is associated with and accessible via a card that has an identifier associated with the increased amount of remaining telecommunication service.

According to one embodiment, one or more of the providing the option, the receiving the input, the causing the mobile device to electronically deliver the advertisement and the enabling the telecommunication service to be used by the mobile device is performed by a telecommunication service carrier system remote from the mobile device.

According to one embodiment, one or more of the providing the option, the receiving the input, the causing the mobile device to electronically deliver the advertisement and the enabling the telecommunication service to be used by the mobile device is performed by the mobile device.

According to one embodiment, a telecommunication service carrier system is provided. The telecommunication service carrier system comprises: at least one computer processor; and a memory coupled to the at least one computer processor, wherein the memory has computer-executable instructions stored thereon that, when executed, cause the at least one computer processor to: cause one or more advertisements associated with a customer of a telecommunication service carrier to be electronically delivered; and electronically provide compensation to the customer in response to the one or more advertisements associated with the customer being electronically delivered.

According to one embodiment, the computer-executable instructions, when executed, further cause the at least one computer processor to: receive electronic consent from the customer to monitor use of the telecommunication service by the customer; determine product and service preferences based on monitoring the use; associate the one or more advertisements with the customer based on the determined product and service preferences; and electronically provide the compensation to the customer at least partially based on the association of the one or more advertisements with the customer based on the determined product and service preferences.

According to one embodiment, the computer-executable instructions, when executed, further cause the at least one computer processor to: electronically receive compensation from a system of an advertiser in response to the one or more advertisements associated with the customer being electronically delivered; and electronically split the compensation received from the system of the advertiser between the telecommunication service carrier and the customer, wherein a customer portion of the split includes a specified amount of cellular telecommunication service provided by the telecommunication service carrier as the compensation to the customer.

According to one embodiment, the computer-executable instructions, when executed, further cause the at least one computer processor to: electronically communicate a statement to the customer which indicates, for each of the one or more advertisements delivered, the customer portion of the split that includes the specified amount of cellular telecommunication service provided by the telecommunication service carrier as the compensation to the customer.

According to one embodiment, a non-transitory computer-readable storage medium is provided. The non-transitory computer-readable storage medium has computer-executable instructions stored thereon that, when executed, cause at least one computer processor to: indicate via a device that receives telecommunication service from a telecommunication service carrier that a specific amount of compensation is available for electronically consenting to have one or more advertisements be immediately presented on one or more devices via the telecommunication service carrier; receive the consent via the device; in response to receiving the consent, immediately cause the one or more advertisements to be presented on the one or more devices; receive an indication that the one or more advertisements have been presented on the one or more devices while the one or more devices are being viewed; and electronically provide the specific amount of compensation to a customer of the telecommunication service in response to receiving the indication that the one or more advertisements have been presented on the one or more devices.

According to one embodiment, the causing the one or more advertisements to be presented on the one or more devices includes one or more of: causing at least one of the one or more advertisements to be presented on the device; causing at least one of the one or more advertisements to be presented as a push notification within a mobile device application or web page of a social media account of the customer; and inserting at least one of the one or more advertisements in a message sent via the telecommunication service from the customer to a recipient.

According to one embodiment, the compensation includes one or more of: telecommunication service, cellular telecommunication service, internet service, telecommunication service upgrades, data service, data service upgrades, text messaging service, subscription to a social media account or service, telephone service, online chat service, electronic messaging service, video conferencing service, television service, cable service, satellite service, satellite phone service, voice over internet protocol (VoIP) service, electronic communication service and utility service.

While various embodiments have been described hereinabove, it is to be appreciated that various changes in form and detail may be made without departing from the spirit and scope of the invention(s) presently or hereafter claimed.

The invention claimed is:

1. A computer implemented method in a telecommunication service system, the method comprising:

electronically determining an amount of telecommunication service remaining available to a mobile device;

electronically providing, by at least one computer processor, an option to a user to enable telecommunication service to be active for a mobile device of the user in response to having an advertisement delivered via the mobile device and based on the determined amount of telecommunication service remaining available to the mobile device;

electronically receiving, by at least one computer processor, input indicating a selection of the option to receive an advertisement delivered to the user via the mobile device;

based on receiving the input of selection of the option, electronically causing, by at least one computer processor, the mobile device to electronically deliver the advertisement for receipt by the user;

receive an indication that the user actually viewed the advertisement on the mobile device; and electronically enabling, by at least one computer processor, the telecommunication service to be active for use by the mobile device in response to the indication that the user actually viewed the advertisement on the mobile device.

2. The method of claim 1 wherein the electronically providing the option to the user based on the determined amount of telecommunication service remaining available to the mobile device includes:

electronically providing the option to the user based on the determined amount of telecommunication service remaining available to the mobile device falling below a threshold amount.

3. The method of claim 2 wherein the electronically providing the option to the user further includes:

electronically providing via one or more of a text message, a pop-up message, a chat message, an email, a push notification and a voicemail message to the mobile device indicating the determined amount of telecommunication service remaining available to the mobile device has fallen below the threshold amount and a selectable user interface element to select the option.

4. The method of claim 1 wherein the telecommunication service is one or more of: cellular telephone minutes, cellular text messaging service, and cellular internet data service.

5. The method of claim 1 wherein the electronically providing the option to a user includes:

electronically providing the option to the user via the mobile device of the user.

6. The method of claim 1 wherein the electronically causing the mobile device to electronically deliver the advertisement includes:

electronically causing the mobile device to perform one or more of: playing a video advertisement on the mobile device; playing an audio advertisement on the mobile device; displaying an advertisement image on the mobile device; displaying a textual advertisement on the mobile device; and displaying an advertisement link on the mobile device.

7. The method of claim 1 wherein the electronically causing the mobile device to electronically deliver the advertisement includes:

electronically causing the mobile device to insert one or more of the following in a message originating from the mobile device to a recipient: a video advertisement; an audio advertisement; an advertisement image; a textual advertisement; and an advertisement link.

8. The method of claim 1 wherein the electronically causing the mobile device to electronically deliver the advertisement includes:

selecting the advertisement from an advertisement server based on the input; and electronically transmitting the advertisement to the mobile device from the advertisement server; and electronically sending a signal to the mobile device to present the advertisement.

9. The method of claim 1 wherein the electronically enabling telecommunication service to be used by the mobile device includes:

automatically increasing an indication of an amount of remaining telecommunication service available to the mobile device in an electronic telecommunication service account associated with the mobile device.

10. The method of claim 9 wherein the increased indication of the amount of remaining telecommunication service available to the mobile device is associated with and accessible via a card that has an identifier associated with the increased amount of remaining telecommunication service.

11. The method of claim 1 wherein one or more of the providing the option, the receiving the input, the causing the mobile device to electronically deliver the advertisement and the enabling the telecommunication service to be used by the mobile device is performed by a telecommunication service carrier system remote from the mobile device.

12. The method of claim 1 wherein one or more of the providing the option, the receiving the input, the causing the mobile device to electronically deliver the advertisement and the enabling the telecommunication service to be used by the mobile device is performed by the mobile device.

13. A telecommunication service carrier system comprising:

at least one computer processor; and a memory coupled to the at least one computer processor, wherein the memory has computer-executable instructions stored thereon that, when executed, cause the at least one computer processor to:

electronically determine an amount of telecommunication service remaining available to a mobile telephone device of a customer of a customer of a telecommunication service carrier;

cause one or more advertisements associated with the customer of the telecommunication service carrier to be electronically delivered via a mobile telephone device of the customer to which the telecommunication service carrier provides telecommunication service in response to the determined amount of telecommunication service remaining available to the mobile telephone device;

receive an indication that the customer actually viewed the one or more advertisements on the mobile telephone device; and in response to the indication that the user actually viewed the one or more advertisements on the mobile telephone device, electronically provide compensation to the customer within the mobile telephone device by enabling a particular amount of additional use of the telecommunication service by the mobile telephone device.

14. The system of claim 13 wherein the computer-executable instructions, when executed, further cause the at least one computer processor to:

receive electronic consent from the customer to monitor use of the telecommunication service by the customer;

determine product and service preferences based on monitoring the use;

associate the one or more advertisements with the customer based on the determined product and service preferences; and electronically provide the compensation to the customer at least partially based on the association of the one or more advertisements with the customer based on the determined product and service preferences.

15. The system of claim 13 wherein the computer-executable instructions, when executed, further cause the at least one computer processor to:

electronically split the compensation received from the system of the advertiser between the telecommunication service carrier and the customer, wherein a customer portion of the split includes a specified amount of cellular telecommunication service provided by the telecommunication service carrier for use by the mobile telephone device as the compensation to the customer.

16. The system of claim 15 wherein the computer-executable instructions, when executed, further cause the at least one computer processor to:

electronically communicate a statement to the customer which indicates, for each of the one or more advertisements delivered, the customer portion of the split that includes the specified amount of cellular telecommunication service provided by the telecommunication service carrier for use by the mobile telephone device as the compensation to the customer.

17. A non-transitory computer-readable storage medium having computer-executable instructions stored thereon that, when executed, cause at least one computer processor to:

indicate via a device that receives telecommunication service from a telecommunication service carrier that a specific amount of compensation is available for electronically consenting to have one or more advertisements be immediately presented on one or more devices via the telecommunication service carrier;

receive the consent via the device;

in response to receiving the consent, immediately cause the one or more advertisements to be presented on the one or more devices;

receive an indication that the user actually viewed one or more advertisements on the one or more devices; and electronically provide the specific amount of compensation to a customer of the telecommunication service in response to receiving the indication that the user actually viewed one or more advertisements on the one or more devices.

18. The non-transitory computer-readable storage medium of claim 17 wherein the causing the one or more advertisements to be presented on the one or more devices includes one or more of:

causing at least one of the one or more advertisements to be presented on the device;

causing at least one of the one or more advertisements to be presented as a push notification within a mobile device application or web page of a social media account of the customer; and inserting at least one of the one or more advertisements in a message sent via the telecommunication service from the customer to a recipient.

19. The non-transitory computer-readable storage medium of claim 17 wherein the compensation includes one or more of: telecommunication service, cellular telecommunication service, internet service, telecommunication service upgrades, data service, data service upgrades, text messaging service, subscription to a social media account or service, telephone service, online chat service, electronic messaging service, video conferencing service, television service, cable service, satellite service, satellite phone service, voice over internet protocol (VoIP) service, electronic communication service and utility service.

* * * * *